C. L. NEDOMA.
UNIVERSAL JOINT.
APPLICATION FILED JULY 15, 1916.
1,226,689.
Patented May 22, 1917.
2 SHEETS—SHEET 1.
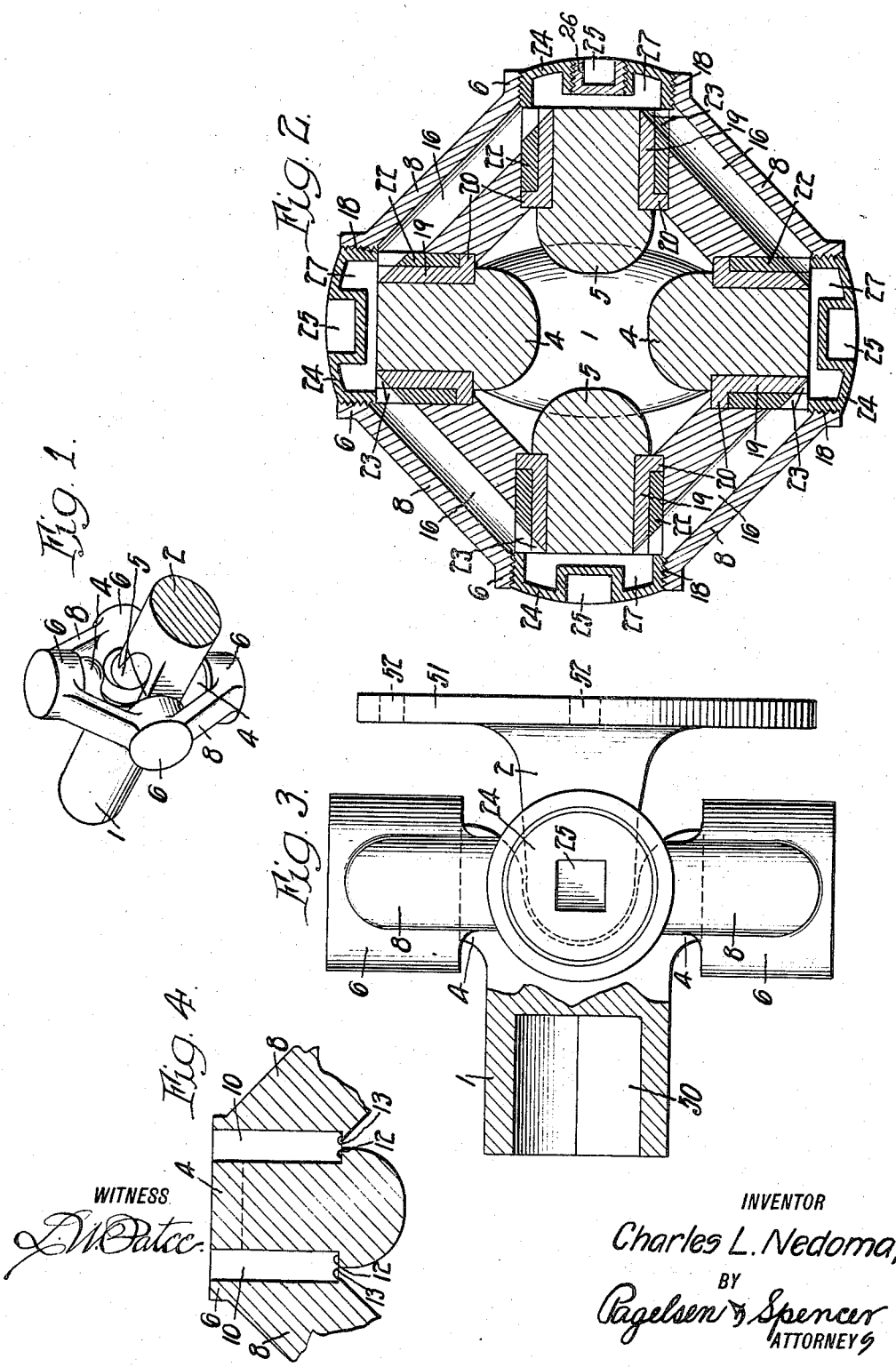
WITNESS
INVENTOR
Charles L. Nedoma,
BY
Pagelsen & Spencer
ATTORNEYS C. L. NEDOMA.
UNIVERSAL JOINT.
APPLICATION FILED JULY 15, 1916.
1,226,689.
Patented May 22, 1917.
2 SHEETS—SHEET 2.
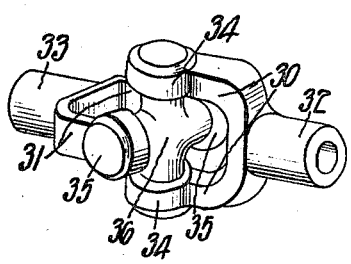
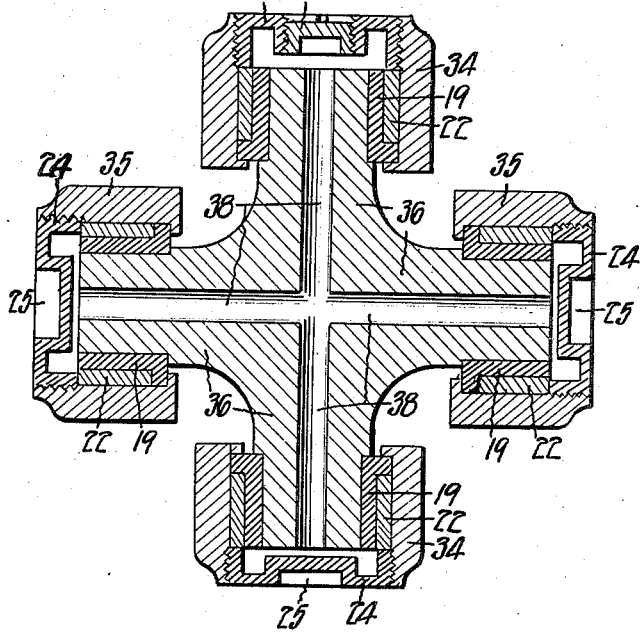
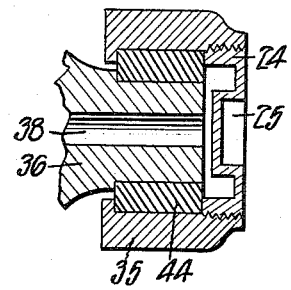
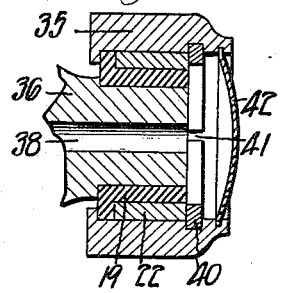
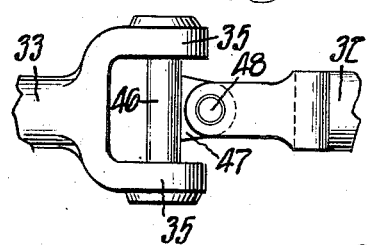
Inventor
Charles L. Nedoma,
By Pagelsen & Spencer
Attorneys
Witness

UNITED STATES PATENT OFFICE.

CHARLES L. NEDOMA, OF DETROIT, MICHIGAN.

UNIVERSAL JOINT.

1,226,689.  Specification of Letters Patent.  Patented May 22, 1917.

Original application filed March 17, 1916, Serial No. 84,769. Divided and this application filed July 15, 1916. Serial No. 109,425.

*To all whom it may concern:*

Be it known that I, CHARLES L. NEDOMA, a subject of the Emperor of Austria, and residing at Detroit, in the county of Wayne and State of Michigan, have invented a new and Improved Universal Joint, of which the following is a specification.

In the manufacture of universal joints it has heretofore been customary to split at least one of the three or more main members involved (that is, the driving, the driven, or the connecting member) in a plurality of parts to allow the joint to be assembled; this construction has been the source of weaknesses and of relatively high manufacturing cost. It has also given rise to difficulties in lubrication and in the exclusion of dust.

The present invention aims to overcome the several objections mentioned, and is concerned with a universal joint wherein neither of the three main members mentioned is split, but in which each, on the contrary, is integral throughout; and it consists in an improved process or mode of operation whereby the joint is formed.

This application is a division of my prior application Serial Number 84,769, filed March 17th, 1916.

In the drawings, Figure 1 is a fragmentary perspective view of one embodiment of the invention showing the three main members cast in one solid piece. Fig. 2 is a central transverse section through the finished joint. Fig. 3 is a side elevation, parts being broken away. Fig. 4 is a fragmentary section showing the manner in which the casting is cut to separate the parts. Fig. 5 is a perspective view, corresponding to Fig. 1, showing another embodiment. Fig. 6 is a central transverse section through the finished joint corresponding thereto. Fig. 7 is a fragmentary section showing a modified bearing. Fig. 8 is a similar view of a second modification. Fig. 9 is an elevation showing a form of joint in which the pivots are offset longitudinally from one another.

Like reference characters refer to like parts throughout the several views.

What may be regarded as the initial step in the manufacture of the improved joint shown in Figs. 1, 2, 3 and 4, is the formation in one solid piece of a casting (Fig. 1) which includes a portion 1, corresponding to the driving (or driven) member, a portion 2, corresponding to the driven (or driving) member, together with a ring-like portion by which the divided ends 4 and 5, respectively, of the members 1 and 2 are joined. In order to save material, the ring portion may be bossed opposite the divided ends of the members 1—2, as indicated at 6, and the bosses may be joined by elements 8 of less cross section; but, while this construction is preferable, it is obvious that the form may be changed within wide limits.

The casting is next secured in a suitable miller or other machine equipped with one or more cutters of proper shape whereby annular chambers 10 are formed (Fig. 4), co-axial with the corresponding ends of the members 1—2, that is, at right angles to said members. It will be noticed that the parts are of such shape as to leave annular shoulders 12 and 13, respectively, in the ends 4—5 and the member 6—8 at the base of the chambers 10 when the tool breaks through and severs the connection between the ring from the other members. The projecting ends 4—5 are then cut down to the dashed line in Fig. 4, although the latter step might be avoided by initially forming the central portion of the boss with a depression, as is obvious.

The members 1, 2 may next be deflected laterally somewhat to allow passages 16 to be drilled longitudinally through the portions 8 of the connector, and the outer ends of the bosses 6 are internally threaded at 18, after which tubular bushings 19 having annular out-turned flanges 20 at their inner ends are inserted into the chambers 10 until the flanges seat upon the shoulders 12—13. These bushings have a drive fit with the corresponding ends 4, 5 of the members 1—2, but enough clearance is allowed between the flanges 20 and the connector 6—8 to insure free turning. Outside of the bushings 19, other bushings 22, preferably of different metal, that have a drive fit with the connector 6—8, are inserted—thus the turning takes place at the meeting faces of the bushings. The bushings are drilled or cut through at 23 to afford communication with the passages 16, and the bosses are finally closed by screw plugs 24 that may be socketed at 25 to receive the end of an appropriate turning tool, one or more of the plugs being preferably provided with a smaller plug 26 to form an opening through which the passages 16 in the connectors and the chambers 27 beneath the plugs may be filled with lubricating oil.

The invention is also applicable to joints wherein the connector is of the form of a cross rather than a ring. Thus (Figs. 5 and 6) the divided ends 30—31, respectively, of the driving and driven members 32—33 may be bossed at 34—35, and may be connected by the cross or spider having four arms 36, it being understood that the parts are cast integrally. The members are then separated by cutting, bushings 19—22 are inserted, and the holes are closed by plugs 24, as before. In this instance, however, the diagonal oil passages 16 are replaced by radial passages 38 which may be drilled or formed by cores.

As indicated in Fig. 7, rings 40, split at 41 and inset into suitable grooves in the bosses 34—35, may retain the bushings in place, while spring diaphragms or disks 42, the edges of which are also received in grooves in said ends, may prevent the escape of oil. In some cases single bushings 44 (Fig. 8), preferably having a driving fit on the arms 36, may be used in lieu of the two bushings 19—22. While it is preferred to arrange the pivots in a single plane transversely of the main members, it is clear that they may be removed from one another. Thus (Fig. 9) the arms 46 of the connecting member 47 are offset from the arms 48 which stand at right angles thereto, and they may even be separated far enough to render the longitudinal dimension of the connecting member much greater than the maximum transverse dimension—the details of the pivots may, of course, be the same as heretofore described. In all cases, the shape of the members 1, 2, 32 and 33 may be varied to correspond to the particular requirements of the installation—as shown in Fig. 3, the member 1 is socketed at 50 to receive a squared end of a shaft (not shown) and the member 2 has a flange 51 perforated at 52 to receive bolts (not shown) whereby it may be secured to an appropriate member; in all cases, also, the oil contained in the passages is thrown outwardly by centrifugal force, and maintains a constant lubrication of the bearing surfaces. It will be seen that the expensive dust excluding casings, at present largely used, are dispensed with.

Many changes, other than those noted, may obviously be made in the details of construction without departing from the spirit of my invention; for example, while tubular bushings are shown throughout, roller, ball or other anti-friction bearings may obviously be substituted therefor. I do not, therefore, wish to be limited otherwise than as indicated by the subjoined claims.

I claim:—

1. The process of forming pivotal joints which consists in casting the two members to be joined in one piece, separating the members from one another by cutting an annular groove in the casting, and inserting a bearing in the groove.

2. The process of forming pivotal joints between two members, one of which includes oppositely extending alined transverse projections and the other of which is perforated to receive the projections and is of such cross-section as to preclude the first member from being removed therefrom, which consists in casting the two members to be joined in one piece, separating the members by cutting alined annular grooves in the casting at points corresponding to the location of the projections, and inserting bearings in the grooves.

3. The process of forming universal joints which consists in casting the driving and driven and connecting members to be joined in one piece, separating the members one from another by cutting annular grooves in the casting at points corresponding to the location of the joints between said members and inserting bearings in the grooves.

4. The process of forming universal joints which consists in casting the driving and driven and connecting members to be joined in one piece, separating the members one from another by cutting annular grooves in the casting at points corresponding to the location of the joints between said members, the joints of each member being in alinement in pairs and of such cross sections as to preclude the component members from being separated, and inserting bearings in said grooves.

5. The process of forming pivotal joints between two members, one of which includes oppositely extending alined transverse projections and the other of which is perforated to receive the projections and is of such cross-section as to preclude the first member from being removed therefrom, which consists in casting the two members to be joined in one piece, separating the members by cutting alined annular grooves in the casting at points corresponding to the location of the projections, inserting bearings in the grooves, and sealing the outer ends of the grooves.

6. The process of forming pivotal joints between two members, one of which includes oppositely extending alined transverse projections and the other of which is perforated to receive the projections and is of such cross-section as to preclude the first member from being removed therefrom, which consists in casting the two members to be joined in one piece, separating the members by cutting alined annular grooves in the casting at points corresponding to the location of the projections, forming an internal passage in one of the members connecting the grooves, said passage being for the reception of lubricant inserting bearings in the grooves, and sealing the outer ends of the grooves.

7. The process of forming pivotal joints between two members, one of which includes oppositely extending alined transverse projections and the other of which is perforated to receive the projections and is of such cross-section as to preclude the first member from being removed therefrom, which consists in casting the two members to be joined in one piece, separating the members by cutting alined annular grooves in the casting at points corresponding to the location of the projections, forming a passage connecting the grooves, said passage being for the reception of lubricant inserting bearings in the grooves, and sealing the outer ends of the grooves.

8. The process of forming pivotal joints which consists in forming the two members to be joined in one piece, separating the members from one another by cutting an annular groove in the piece, and inserting a bearing in the groove.

9. The process of forming pivotal joints between two members, one of which includes oppositely extending alined transverse projections and the other of which is perforated to receive the projections and is of such cross-section as to preclude the first member from being removed therefrom, which consists in forming the two members to be joined in one piece, separating the members by cutting alined annular grooves in the piece at points corresponding to the location of the projections, and inserting bearings in the grooves.

10. The process of forming universal joints which consists in forming the driving and driven and connecting members to be joined in one piece, separating the members one from another by cutting annular grooves in the piece at points corresponding to the location of the joints between said members and inserting bearings in the grooves.

11. The process of forming universal joints which consists in forming the driving and driven and connecting members to be joined in one piece, separating the members one from another by cutting annular grooves in the piece at points corresponding to the location of the joints between said members, the joints of each member being in alinement in pairs and of such cross sections as to preclude the component members from being separated, and inserting bearings in said grooves.

12. The process of forming pivotal joints between two members, one of which includes oppositely extending alined transverse projections and the other of which is perforated to receive the projections and is of such cross-section as to preclude the first member from being removed therefrom, which consists in forming the two members to be joined in one piece, separating the members by cutting alined annular grooves in the piece at points corresponding to the location of the projections, inserting bearings in the grooves, and sealing the outer ends of the grooves.

13. The process of forming pivotal joints between two members, one of which includes oppositely extending alined transverse projections and the other of which is perforated to receive the projections and is of such cross-section as to preclude the first member from being removed therefrom, which consists in forming the two members to be joined in one piece, separating the members by cutting alined annular grooves in the piece at points corresponding to the location of the projections, forming an internal passage in one of the members connecting the grooves, said passage being for the reception of lubricant inserting bearings in the grooves, and sealing the outer ends of the grooves.

14. The process of forming pivotal joints between two members, one of which includes oppositely extending alined transverse projections and the other of which is perforated to receive the projections and is of such cross-section as to preclude the first member from being removed therefrom, which consists in forming the two members to be joined in one piece, separating the members by cutting alined annular grooves in the piece at points corresponding to the location of the projections, forming a passage connecting the grooves, said passage being for the reception of lubricant inserting bearings in the grooves, and sealing the outer ends of the grooves.

CHARLES L. NEDOMA.